April 17, 1945.　　　　　J. FERLA　　　　　2,374,086
MACHINE FOR PRODUCING PIPES
Filed Oct. 19, 1939　　　　8 Sheets-Sheet 4
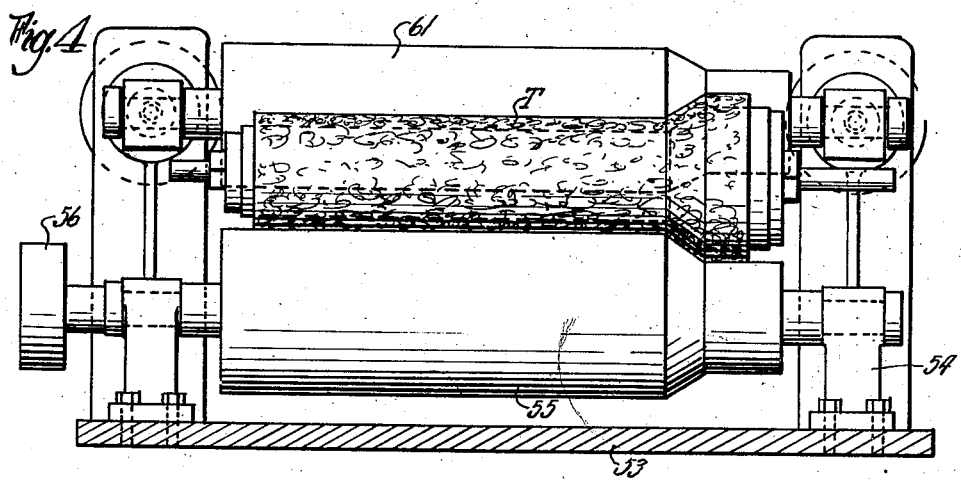
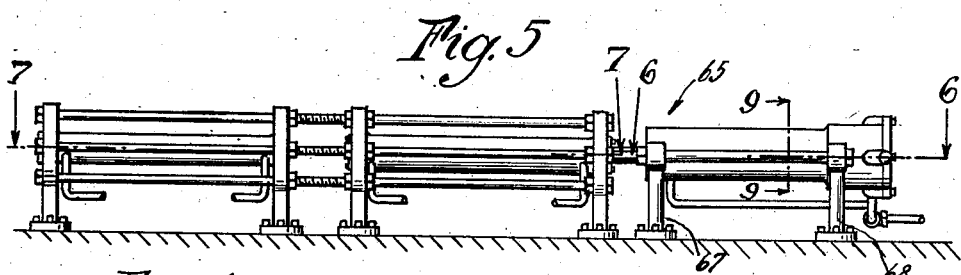
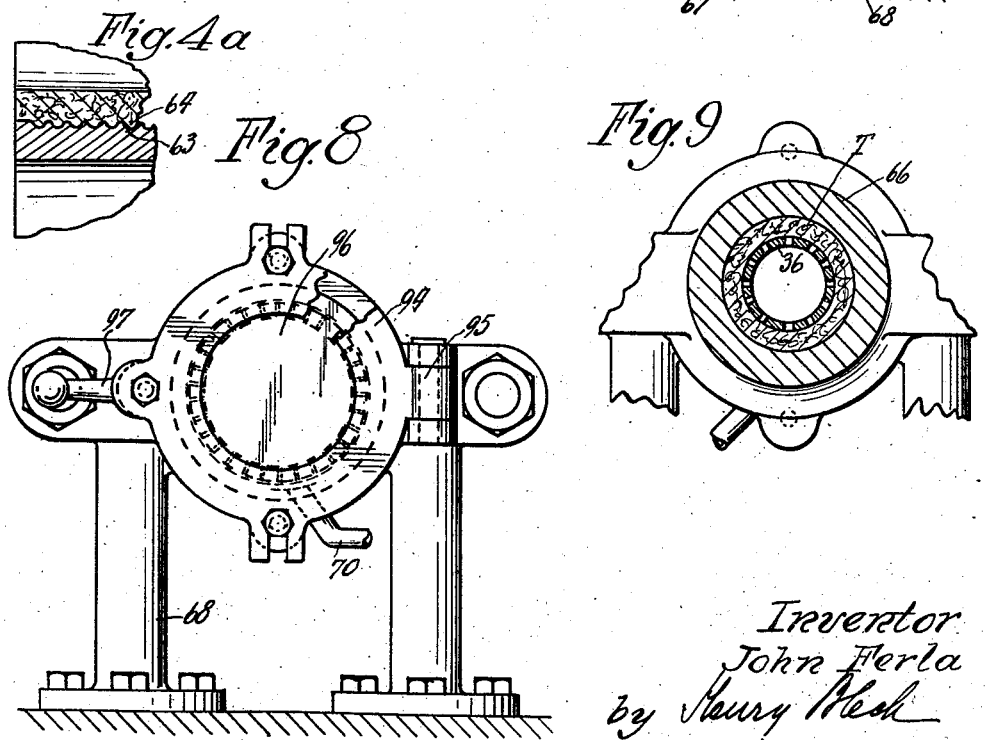
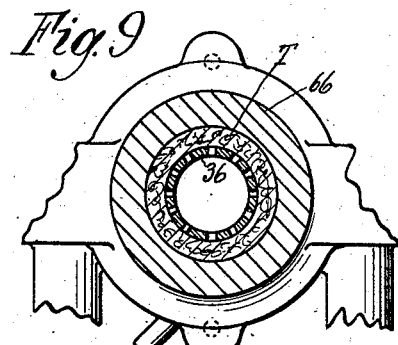
Inventor
John Ferla
by Henry Wash
Attorney.

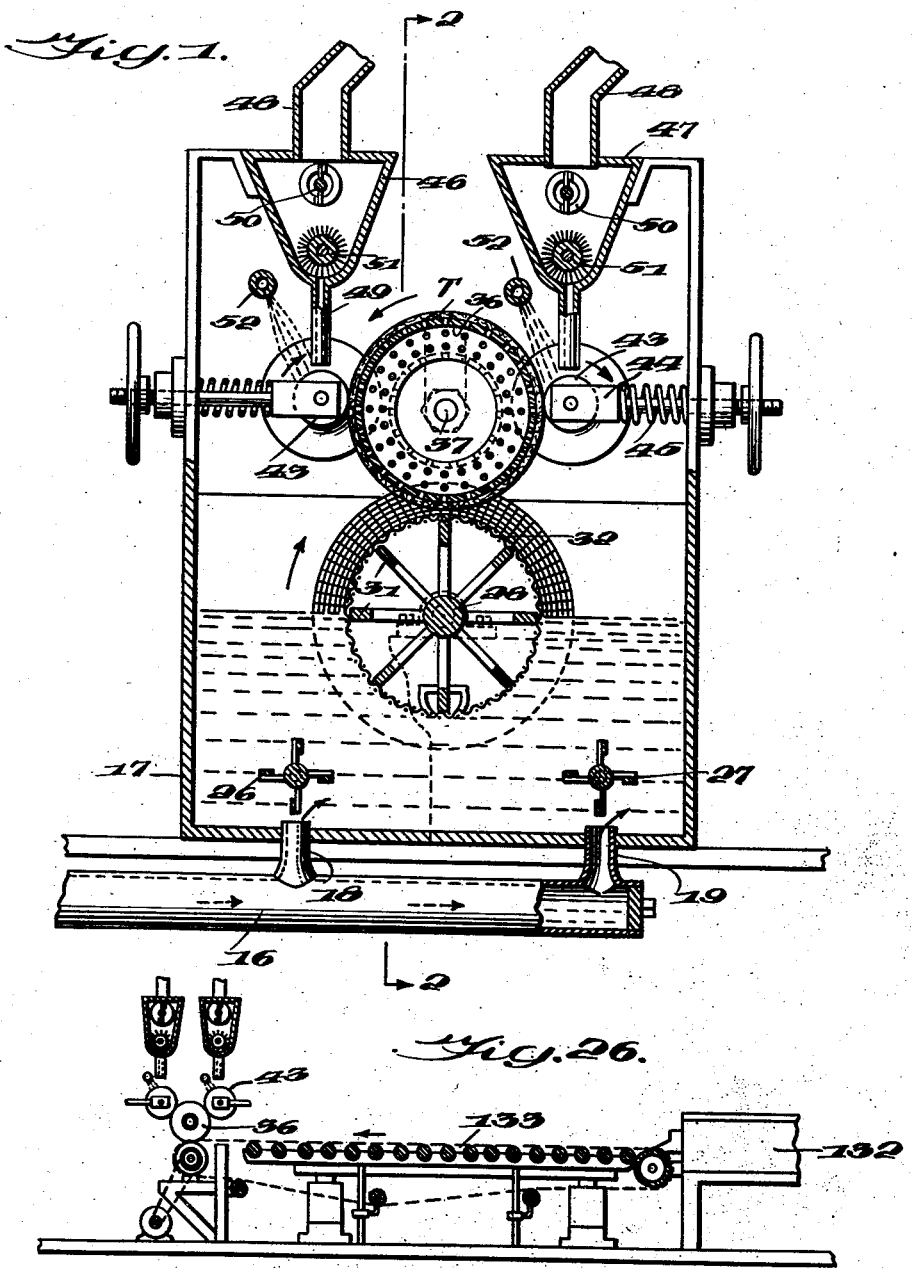

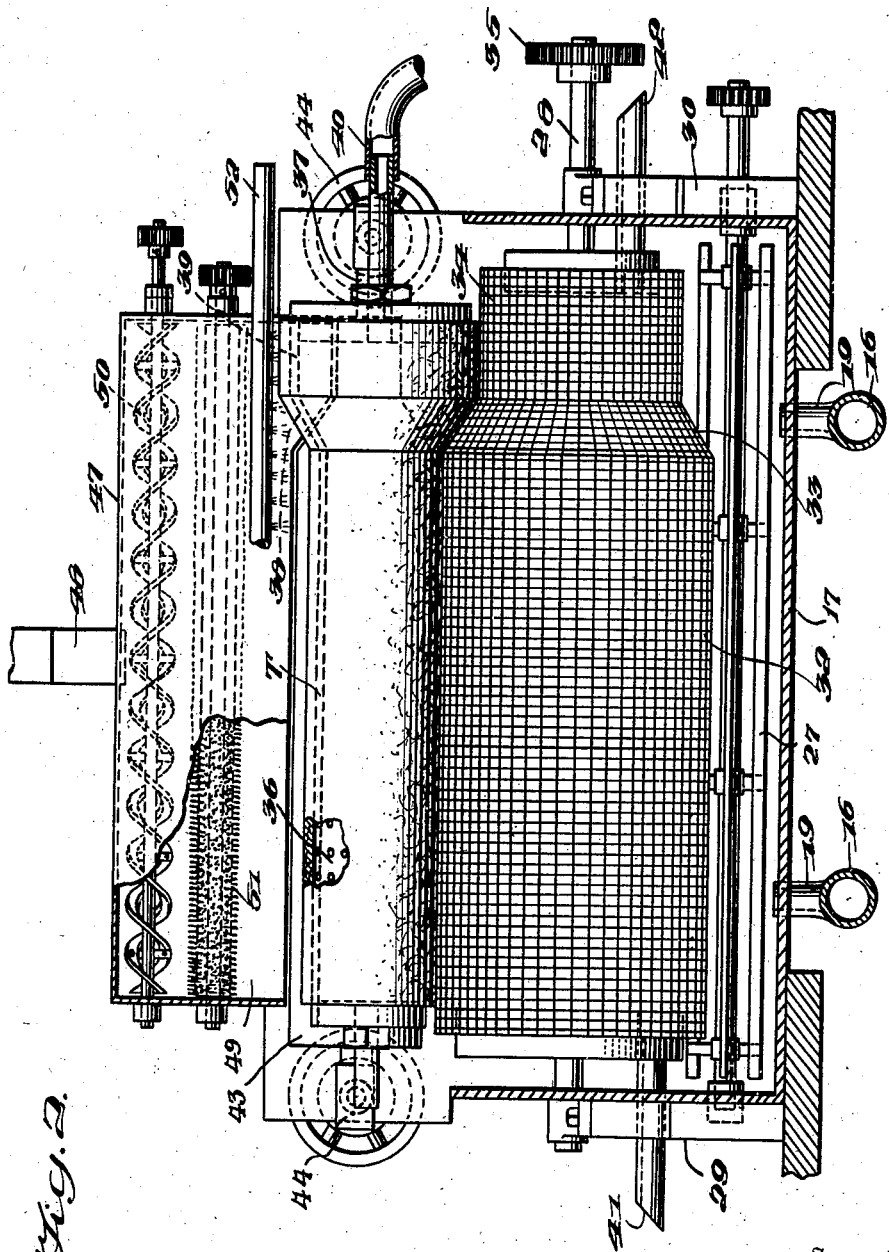

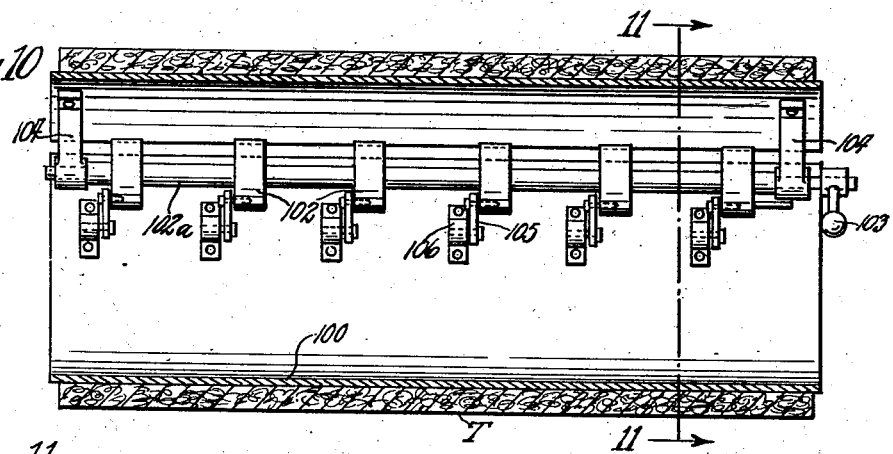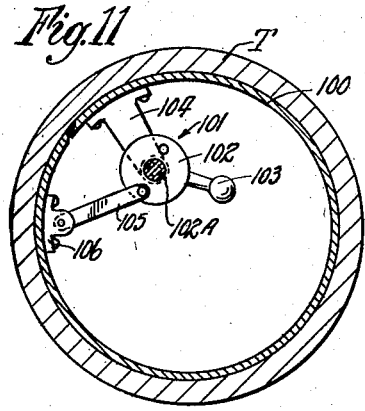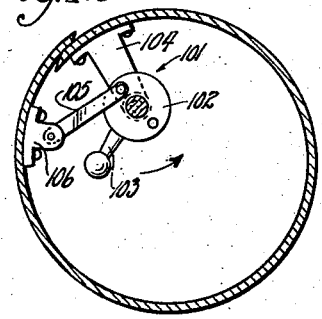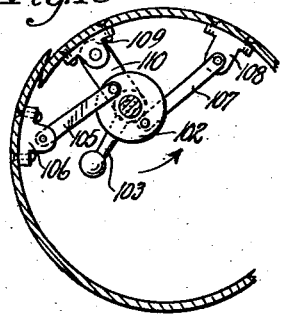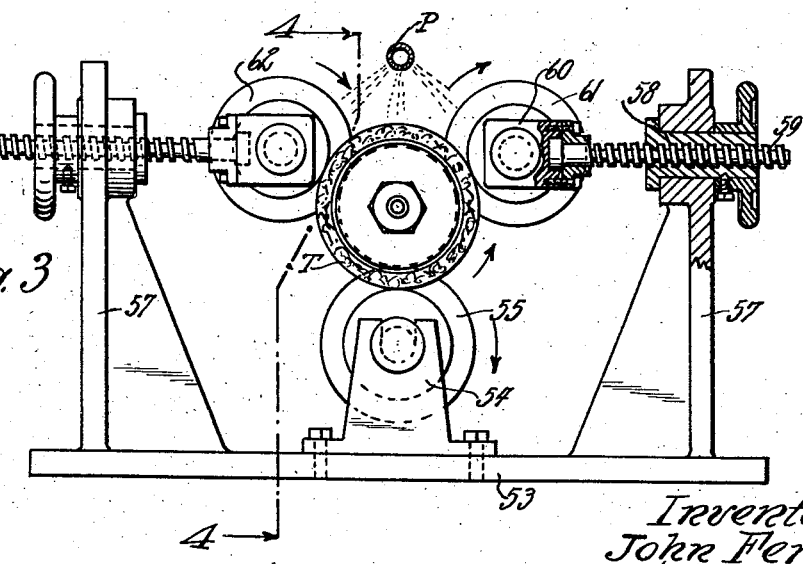

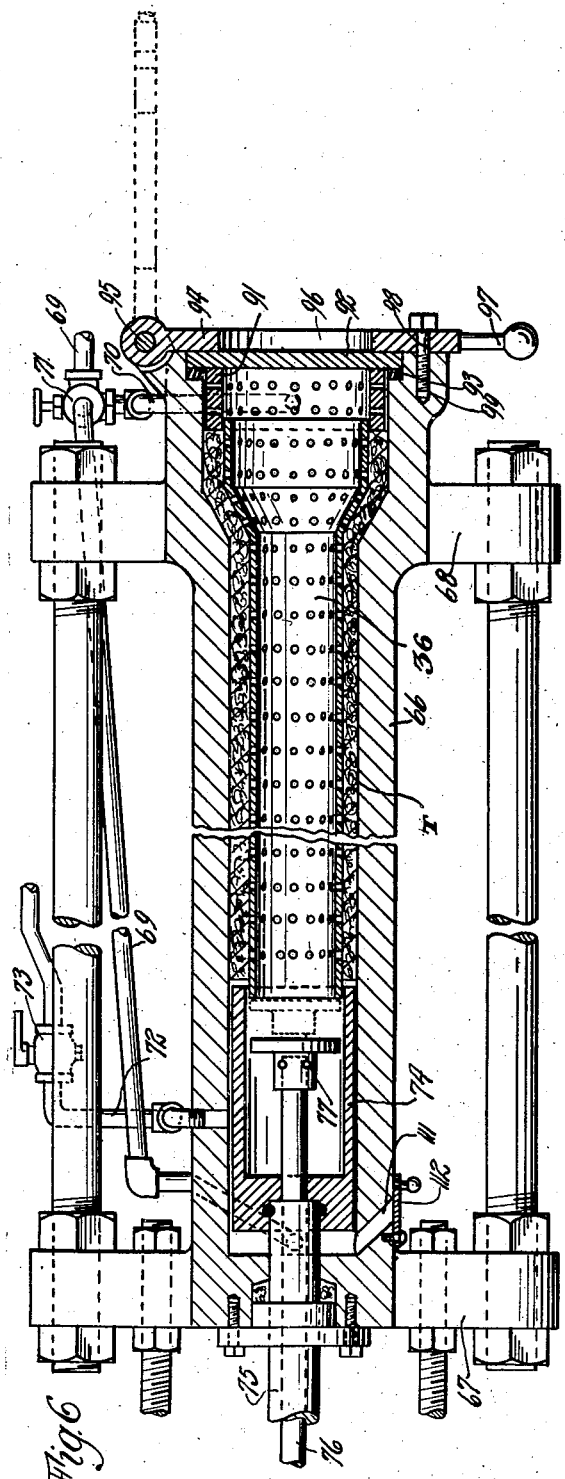

April 17, 1945.   J. FERLA   2,374,086
MACHINE FOR PRODUCING PIPES
Filed Oct. 19, 1939   8 Sheets-Sheet 6

Inventor
John Ferla
by Henry Meek
Attorney

April 17, 1945. J. FERLA 2,374,086
MACHINE FOR PRODUCING PIPES
Filed Oct. 19, 1939 8 Sheets-Sheet 7
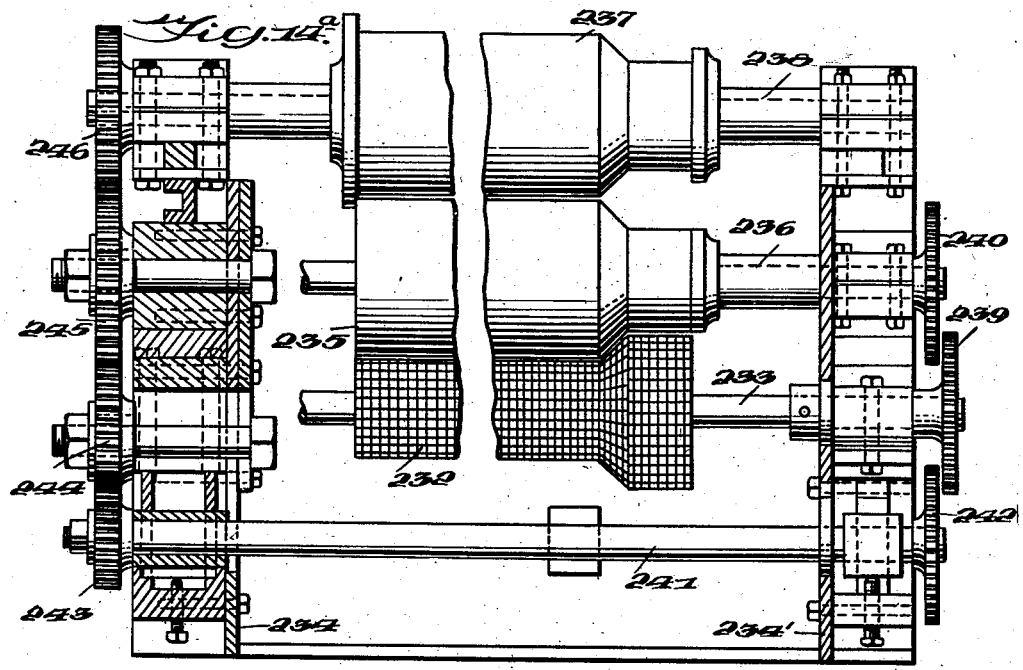
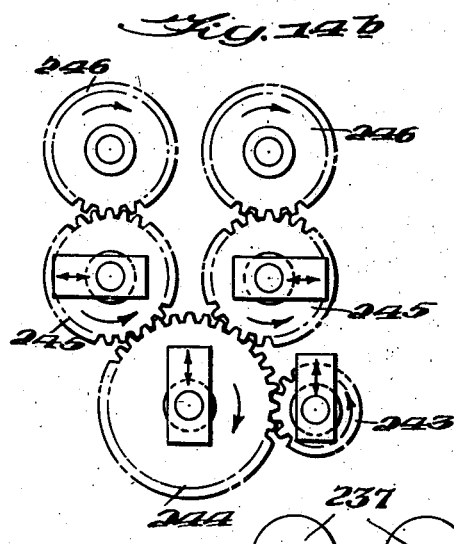
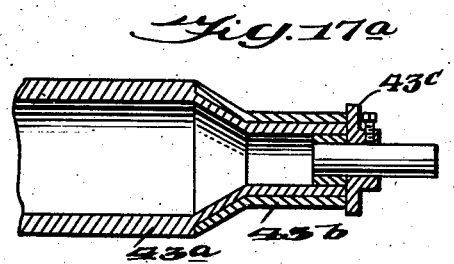
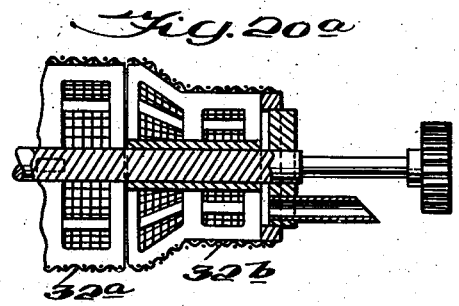
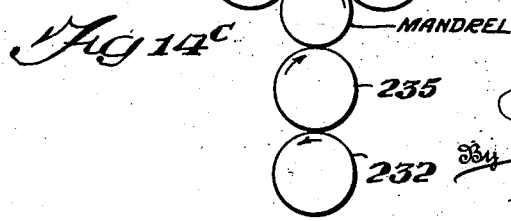
Inventor
John Ferla
By J. Preston Swecker
his Attorney April 17, 1945.  J. FERLA  2,374,086
MACHINE FOR PRODUCING PIPES
Filed Oct. 19, 1939  8 Sheets-Sheet 8
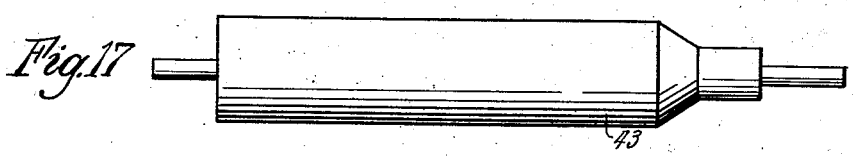
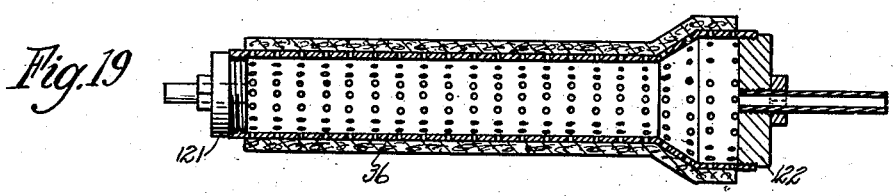
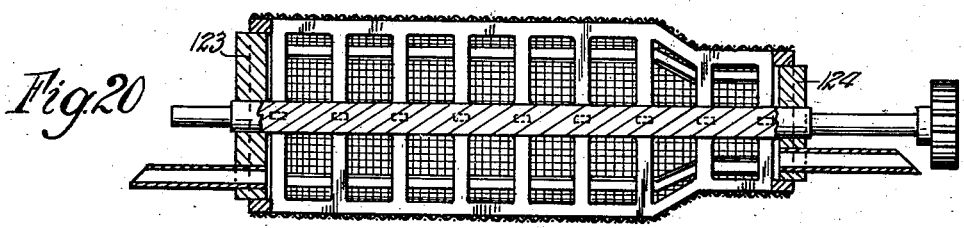
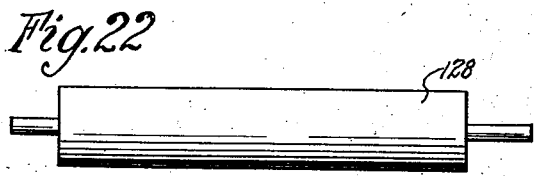
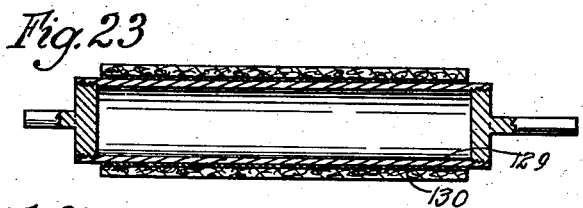
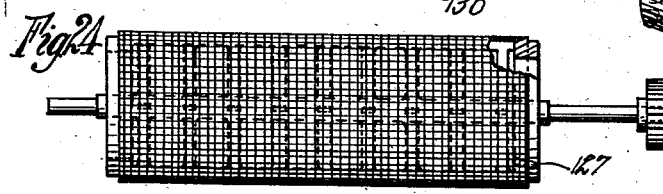
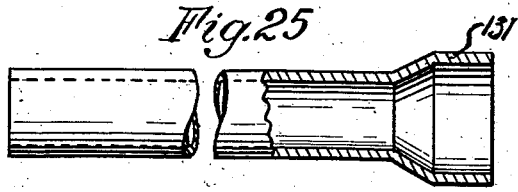
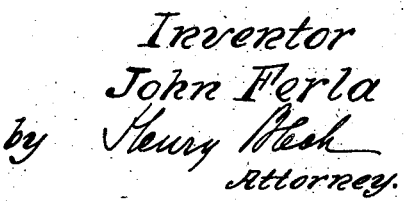
Inventor
John Ferla
by Henry Hash
Attorney.

Patented Apr. 17, 1945

2,374,086

UNITED STATES PATENT OFFICE 2,374,086

MACHINE FOR PRODUCING PIPES

John Feria, Camden, N. J., assignor, by direct and mesne assignments, to U. S. Asbestos Cement Pipe Company, Camden, N. J., a corporation of New Jersey Application October 19, 1939, Serial No. 300,275

29 Claims. (Cl. 92—66)

This application is a continuation in part of my prior application on Method of producing tubes, Ser. No. 184,509, filed January 12, 1938, now Patent No. 2,177,643, granted October 31, 1939.

The invention relates to means for manufacturing tubes of a composition material, such as asbestos and cement, or pulp material.

The invention also may be used for the manufacture of sheeting by first producing a tubular structure, which is slit along one longitudinal edge and developed into flat form.

While the invention deals primarily with tubes of asbestos and cement composition, it may utilize other cementitious compositions or be combined with other ingredients, such as infusorial earth, soapstone, talc, silica, hydrates of lime, waterproofing compound, or any other refractory material capable of forming a binder with asbestos and cement.

In the art, it has been known to produce tubes or sheeting, either by a cardboard machine, which is a complicated apparatus and employs expensive felt conveyors and is wasteful, or by rotary or travelling screens, which also operate in conjunction with felt conveyors; so that the production of tubes or sheeting by these means becomes expensive and, in addition, entails other disadvantages, such as, for instance, that only moderate pressure tubes can be produced, which lack compactness and strength.

It is, therefore, one of the main objects of the present invention to provide for producing sheeting, plain-ended tubes, or tubes with bell collars, which may be inexpensively manufactured, dispensing with the employment of felt conveyors, and which tubes are compact, non-porous, and of high resistivity and strength.

It is an important object of the invention to provide for producing tubes with bell collars on a mandrel without breakage of the bell collar due to relative circumferential speeds of different sized portions thereof. This is accomplished by the provision of relatively movable peripheral portions on a roll or cylinder bearing against the different sized portions of the mandrel.

It is a further object of the invention to form the tube from a mixture of composition material, in which the water content and the cement and asbestos content have a definite pre-determined ratio, so that the end product in the continuous operation of tubes is always of the same quality and strength.

It is a further object of the invention to provide for applying the composition material as a liquid pulp, which is utilized to form the basic or initial layer for the tube or sheet material, and to which additional layers of the same material are caused to adhere under compression, and build up to a thickness to suit the particular requirements of the tube or sheeting.

It is a further object of the invention to provide for the productinon of tubes or sheeting as low as ⅛ of an inch in thickness, up to any commercial dimension.

A still further object of the invention embodies the provision whereby the composition material is initially prepared substantially of the same consistency as wet clay, and molding said composition material into the required tubular form by continuous longitudinal pressure until the tube is completely formed.

It is also an object of the invention wherein the composition material is subjected to a preliminary compression, and thereafter to a final compression.

It is a further object of the invention to provide tubes with corrugations, with or without bell collars.

It is also an object of the invention to provide for producing tubes in length exceeding those capable of being manufactured by the cardboard or paper machines.

It is also an object of the invention to provide for forming tubes or sheeting, which are capable of being mixed in the process of manufacture with water-proofing compound, so that the tubes or sheeting are inherently waterproof; and, if desired, surface water-proofing may be added.

Numerous other objects, equally as important as those mentioned, will become apparent from a perusal of the invention, which is set forth in a preferred embodiment, together with modifications thereof, illustrated by more or less diagrammatic views in the accompanying drawings, in which:

Fig. 1 is a vertical cross-section, partly in elevation, of an apparatus embodying this invention;

Fig. 2 is a longitudinal vertical section on the line 2—2 of Fig. 1;

Fig. 3 is an end view of a calender machine;

Fig. 4 is a vertical section therethrough on the line 4—4 of Fig. 3;

Fig. 4a is a fragmentary detailed section of the tube and associated roller, when tubes are formed with rough surfaces, which are shown exaggerated;

Fig. 5 is an assembly view in side elevation of the entire finishing apparatus;

Fig. 6 is a horizontal section therethrough on the line 6—6 of Fig. 5;

Fig. 7 is a similar section on the line 7—7 of Fig. 5;

Fig. 8 is an end view of the apparatus shown in Fig. 6;

Fig. 9 is a cross-section on the line 9—9 of Fig. 5;

Fig. 10 is a longitudinal section through a collapsible shell;

Fig. 11 is a cross-section therethrough on the line 11—11 of Fig. 10;

Fig. 12 is a view similar to Fig. 11, showing the shell in collapsed condition;

Fig. 13 is a view similar to Fig. 12, of a slightly modified form of shell;

Fig. 14a is a side elevation, partly in section, of a further modified arrangement of the molding screen and calenders, with drives therefor;

Fig. 14b is a diagrammatic end view of the drives thereof;

Fig. 14c is a diagrammatic end view of the screen and rolls;

Fig. 17 is a top plan view of a compression roller for cooperation with a mandrel, shown in Fig. 1;

Fig. 17a is a partial sectional view through a calender roll of modified form;

Fig. 18 is a perspective view of a finished tube, provided with a bell collar;

Fig. 19 is a longitudinal section through the mandrel and formed tube, the mandrel having closing discs at both ends;

Fig. 20 is a longitudinal section through the power driven rotary molding screen;

Fig. 20a is a partial sectional view through a screen mold of modified form;

Fig. 21 is a perspective view of an ordinary straight finished tube;

Fig. 22 is a top plan view of a roller, similar to Fig. 17, but having plain ends without the bell collar;

Fig. 23 is a section through an imperforate mandrel, surrounded by a fabric lining intermediate the mandrel and the formed tube;

Fig. 24 is a top plan view of a power driven rotary molding screen, used in conjunction with the roller and mandrel, shown in Figs. 22 and 23;

Fig. 25 is a section through a shell used with a mandrel; and

Fig. 26 is an assembly view in section of a modified form of molding apparatus.

Figure 14:
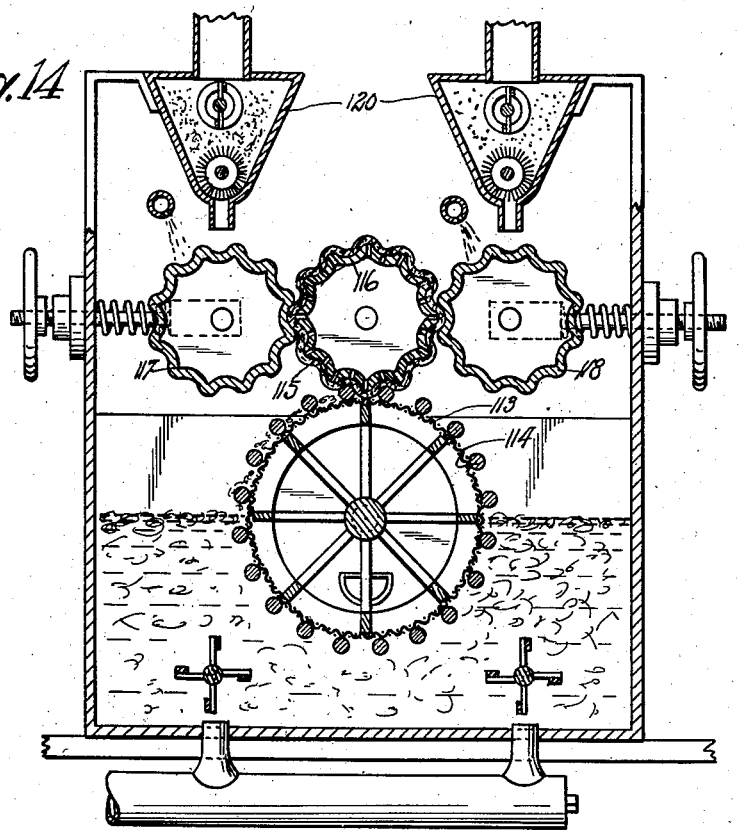
Fig. 14 is a view similar to Fig. 1 of the apparatus for producing corrugated tubes.
Figure 15:
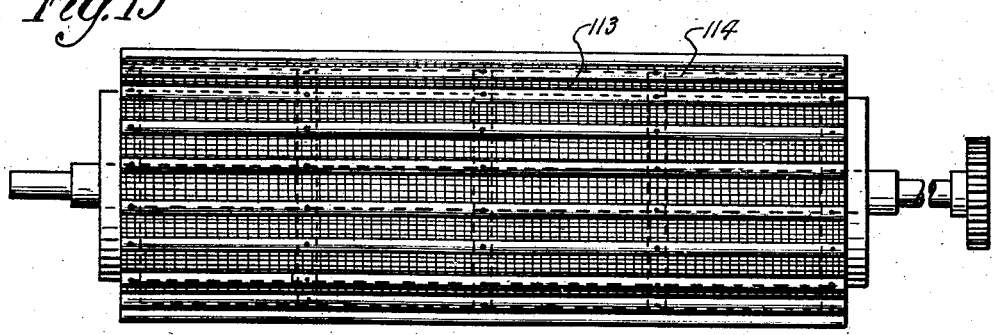
Fig. 15 is a top plan view of the power driven rotary screen used in the apparatus shown in Fig. 14.

In the manufacture of sheeting or tubes from cementitious composition material, preferably asbestos and cement and/or various other ingredients, it is very important that the mixture of the various ingredients shall have a predetermined fixed ratio, so as to insure a perfect end product.

It is for this reason that great care has been given to the solution of this problem and the present invention has been evolved with the object in view of obtaining a product of uniform standard quality, which is non-porous, highly resistant and merchantable.

While the invention is particularly described in connection with the manufacture of asbestos and cement tubes, it is, of course, understood that it is not limited to the particular ingredients mentioned, being applicable generally to cementitious materials; nor to the particular formation of tubes, but the invention may be applied wherever suitable, and is merely described by way of example, and not by way of limitation.

In forming asbestos cement tubes, the ingredients are first mixed in a dry state, the asbestos having been subjected to considerable treatment so as to remove any crude fibres, to render the same fluffy without diminishing the length of the fibres and to render the same capable of intimate mixture with other ingredients in dried form, whereupon the mixture is ready to be introduced into a vat which contains water, and subjected to the influence of agitators.

From the mixing vat, the mixture is conducted into a reservoir and thence into tubes 16 which lead to a large vat 17 with which the tubes 16 communicate by the outlets 18 and 19.

The vat 17 is filled with a mixture having a maintained liquid level, and is provided with a plurality of agitators 26 and 27, to keep the mixture agitated and in suspension and maintain uniform consistency.

A horizontal shaft 28 extends longitudinally through the vat and is supported in bearings 29 and 30 provided on the outside of the vat and attached thereto.

The shaft 28 carries a spider frame 31 on which is mounted a cylindrical screen 32 which at the right end, as viewed in Fig. 2, is provided with a frusto-conical portion 33, and thence continues into a cylindrical portion 34 of smaller diameter than the body portion of the screen, for a purpose later to be described.

The shaft 28 is provided with a gear 35 to which power is imparted from any suitable source, so that the screen 32 is directly driven and is partly immersed in the mixture contained in the vat 17, and acts as a carrier for bringing the layers of the liquid mixture to a roller or mandrel, generally designated by 36, which is supported on horizontal stub shafts 37, and is formed on the right end as viewed in Fig. 2, with a frusto-conical portion 38, and then with a cylindrical portion 39, of larger diameter than the body portion of the mandrel.

It is obvious that a tube formed on the mandrel will take the same form, at the right end, as the frusto-conical and cylindrical portion of the mandrel, whereby a tube with a so-called bell collar on one end is produced.

The mandrel may be provided with perforations throughout its length while its interior communicates with a pipe 40, which leads to a vacuum pump (not shown), if vacuum be desired for starting the forming operation, but it is not essential.

If desired, a strip of fabric may be placed around the mandrel to prevent the suction from drawing the cementitious material into and closing the perforations of the mandrel.

Drain pipes 41 and 42 are provided at opposite ends of the screen mold 32, and serve to drain therefrom the water which enters the interior of the rotary screen in its operation.

The mandrel 36 is engaged on each side by a roller 43, which is mounted in bearings 44, adjustably mounted in walls of the vat 17, there being a spring 45 interposed between each bearing and the wall of the vat to maintain the roller in resilient engagement with the mandrel. The springs 45 are threaded over screw shafts connected with the bearings 44.

Hoppers 46 and 47 are provided at the top of the vat to which the dry mixture of asbestos and cement, as described above, is supplied by a chute 48, and which hoppers discharge the mixture through a chute 49 onto the roller 43.

In the hopper, an agitator 50 is provided to keep the mixture agitated, and a brush roller 51, near the bottom of the hopper, regulates the rate of discharge.

A pipe 52, provided with perforations, emits atomized water and sprays the same on top of each roller 43, so as to impart to the dry mixture just sufficient moisture to make the same adhere to the roller and to form a cement aggregate in a layer thereon.

In operation, the liquid mixture in the vat 17 forms a liquid layer on the periphery of the rotary screen 32 and is transferred thereon onto the mandrel as an initial layer due to the matural adherence of the wet mixture, enhanced by the suction effect maintained in the interior of the mandrel.

In the continuous rotation of the mandrel, by reason of its frictional engagement with the rotary screen, the dry mixture, moistened by the sprays 52, is superposed by the rollers 43 onto the initial layer formed by the rotary screen; so that, in a complete revolution of the mandrel, there are formed from one to at least three layers, the first one being the initial layer produced by the rotary screen; thereafter the second layer of moistened mixture is imparted by the right roller 43, as viewed in Fig. 1; and thereafter the third layer is produced by the left roller 43, also of moistened mixture if a greater thickness is desired. This successive application of layers continues until the desired thickness of the pipe is built up, the wet layers supplied by the mold screen 32 alternating with the dry or semi-dry layers applied thereover by the rollers 43.

The moistened layers are compacted with the initial layer by pressure engagement of the rollers 43, and adhere to the mandrel and to each other, and this process is continued until the proper thickness of the tube is built up.

Attention is called to the fact that mandrel is floatingly mounted so as to engage under gravity the molding screen in a bearing, which is open at the top, so that the mandrel can be lifted up vertically, as will be hereinafter described.

It is noteworthy that, when the initial layer is formed on the mandrel by vacuum or suction being maintained therein, this aids in causing the initial layer to adhere to the mandrel; but that once the initial layer is formed, it merely acts as an anchoring means for the dry mixture to adhere thereto, and the continued use of the vacuum is not necessary but may be utilized to some extent to remove the water which is extracted from the layers by the pressure of the rollers 43.

As soon as the tube of the desired thickness is built up, the rotary screen is, of course, brought to a standstill; the mandrel and the tube formed thereon are removed by lifting them out vertically or horizontally, and a new mandrel is put in place for the production of another tube.

After the tube has been built upon the mandrel 36, if a high pressure tube is desired, the mandrel and the tube, as a unit, are lifted out and placed in the calender machine, shown in Figs. 3 and 4. The same comprises a base 53, having bearings 54, in which is journaled a roller 55, provided with a pulley 56, to which power from any suitable source is imparted.

On the base 53 are also provided standards 57, each equipped with a bushing 58, to receive a threaded spindle 59 which, at its forward end, carries a frame 60, in which one end of a roller 61 is journaled, adapted to contact with one side of the tube, which is still on the mandrel 36. A roller 62, mounted similarly to the roller 61, is engaging the tube on the other side thereof.

A pipe P is arranged above the tube and is provided with a series of perforations to emit waterproofing compound in atomized state to spray the rollers 61, 62, and the tube T, so that, in addition to the inherent waterproof character of the tube, by reason of mixing a waterproof compound with the dry mixture, also a surface waterproofing may be provided.

In operation, the power driven roller 55 causes the tube and the mandrel to rotate, and by friction, rollers 61 and 62 are driven, which latter are calender rollers and impart a smooth finish to the surface, and also compact the same further.

If it is desired to give to the tube a rough surface, then the rollers are provided with grooves 63 (Fig. 4a) which produce fine ribs 64 on the tube, whereby the same is provided of greater strength.

It is, of course, to be understood that, when the tube is first formed on the mandrel, it is a roughly finished product and may be used for some purposes. However, if a better appearing tube is desired or one of high compression, then it is placed in the calender machine, and further compacted, as stated before. The tube thus produced is suitable as an electrical conduit.

In order to produce a high pressure tube, the tube and mandrel are removed from the calender machine or, if desired, directly from the molding machine, and are forced into the compression machine, shown in Figs. 5, 6 and 7. The compression machine, generally indicated by 65, comprises a casing 66 of the general outline of the tube and the bell collar, which casing is supported on standards 67 and 68.

The vacuum tube 69 leads to the rear end of the chamber formed by the casing, and a branch pipe 70, controlled by a valve 71, leads to the forward end of the casing chamber.

A pipe 72, provided with a valve 73, admits air and water into the casing, as indicated in Fig. 6.

A hollow piston 74, of slightly smaller diameter than the chamber, is secured to a piston rod 75, which is hollow and surrounds another piston rod 76, which projects through the piston rod 75, and through the piston 74, and has secured thereto, at its forward end, an auxiliary piston 77, which has a diameter sufficient to contact with the walls of the mandrel 36.

The piston rod 75 enters a casing 78 and is connected with a piston 79, which is under the influence of pressure fluid admitted into the chamber of the casing 78 behind the piston 79 by a pipe 80, leading to a valve 81, whence the pipe 82 leads to the front part of the chamber defined by the casing 78.

The piston rod 76 continues on and enters a casing 83, where it is provided with a piston 84.

Pipes 85 and 86 lead from a valve 87, respectively, to the rear and front portion of the chamber in the casing 83. A pipe 88 connects the valves 81 and 87 and is provided with a fitting 89, whence a pipe 90 leads to a source of pressure fluid supply (not shown).

It is thought unnecessary to describe the details of the construction of the compression machine as not per se forming a part of the invention and only such parts are referred to which are necessary for an understanding of the invention.

When the mandrel and the tube are forced into the compression machine, they occupy the position shown in Fig. 6, care being taken that the frustro-conical portions of the tube and of the casing 66 coincide, for which purpose a perforated ring 91 is inserted, which ring is slightly smaller than the diameter of the chamber to provide an outlet for the passage of water.

In addition, a removable plate 92 is provided in abutting relation to the ring, there being a packing ring 93 provided to form a perfect seal.

A door 94 is hingedly connected with the casing, as at 95, and is provided with an opening 96, which is slightly larger than the diameter of the largest portion of the mandrel 36, and the other end of the door is provided with a handle 97 and has a bolt 98, adapted to enter an aperture 99 in the casing wall.

When the parts are in the positions shown in Fig. 6, the piston 74 is caused to advance by applying pressure to the piston 79 in the casing 78, which pressure preferably is one thousand pounds per square inch, more or less, and causes longitudinal compression of the tube.

Thereafter the door 94 is opened; the plate 92 removed and replaced by an imperforate large ring (not shown), whereupon the door 94 is closed and the piston 77 is caused to advance by permitting pressure to act on the piston 84, which pressure preferably is about one hundred pounds per square inch, more or less.

The advance of the piston 77 forces the mandrel 36 through the door opening 96 and is discharged onto a conveyor (not shown), which conveyor is of a form adapted to cradle the mandrel.

Thereafter the piston 77 is returned to its original position. After the ejection of the mandrel, the door 94 is opened and a collapsible shell, shown in Figs. 10 to 13, is inserted while the door 94 is open and the imperforate filler ring removed.

Thereafter the tube and shell are removed and left lying until ready for use, the shell serving to maintain the form of the tube and facilitate the handling of the material, while in "green" condition. The piston 74 serves to eject the tube.

As indicated in Figs. 10 to 12, a collapsible shell 100 is slit longitudinally, and is controlled by a crank mechanism, generally designated by 101, which comprises discs 102, mounted on a shaft 102a journaled in bearings 104 on one edge of the split shell. The shaft has a handle 103 to actuate the crank mechanism 101.

A link 105 is secured to each disc 102 and is connected to a bracket 106, secured to the shell on the opposite side of the longitudinal slit.

It is evident that, upon actuation of the handle 103, the mandrel may be expanded into the position shown in Fig. 11 or collapsed into the position shown in Fig. 12.

In Fig. 13 a modification of the crank mechanism for the collapsible shell is shown, wherein an additional link 107 is provided, which is attached to a bracket 108, also secured to the shell adjacent a bearing 109, to which is pivoted a link 110 secured to the disc 102. Thus a double throw for the crank is provided, which is useful where small tubes are involved.

Referring again to Fig. 6, attention is called to the provision of a blow out opening 111, controlled by a valve 112, permitting particles of materials, or any foreign substances, to be blown out by opening the valve 73, so that water may flow between the piston 74 and the casing wall to escape through the opening 111, carrying along the foreign substances.

Before a mandrel and tube are placed in the compression machine, a cloth wad, saturated with a lubricant, is placed on the piston 77, and the same is reciprocated so that the walls of the casing 66 are properly lubricated for the reception of a tube and mandrel.

In Fig. 14 a view similar to Fig. 1 is shown, depicting the molding of corrugated tubes. Here a cylindrical screen 113 is provided with longitudinal rods 114, spaced circumferentially, which cooperate with longitudinal grooves 115 on a mandrel 116, so that in the rotation of the screen, the liquid mixture of cementitious material is imparted by both the longitudinal rods and the intervening screen portions to the mandrel and, likewise, rollers 117 and 118 are corrugated to cooperate with the surface of the mandrel in producing corrugated tubes.

Figure 16:
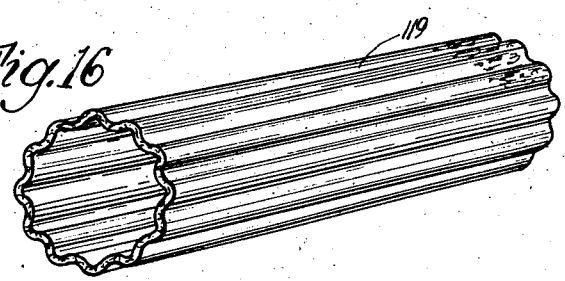
Fig. 16 is a perspective view of a corrugated tube produced thereon.

The corrugated tube 119, shown in Fig. 16, constitutes the final product obtained with the apparatus shown in Fig. 14.

The modus operandi of this apparatus is in all respects similar to the straight tube obtained with the apparatus depicted in Fig. 1, and includes the placing of an initial layer, from the liquid mixture, onto the mandrel, and superposing of two layers obtained from the dry mixture stored in hoppers 120, and thereafter moistened on the transfer rolls, and repeating this cycle of operations until a tube of desired thickness is built up.

A further modification is shown in Figs. 14a, 14b and 14c in which the screen mold is designated 232. The screen mold 232 is mounted on a shaft 233 journaled in bearings in standards 234 and 234' capable of vertical adjustment, as indicated in Fig. 14b. The screen mold 232 has bearing thereagainst a transfer calender roll 235 on a shaft 236 also journaled in bearings in the standards 234 and 234', but capable of horizontal adjustment to accommodate for adjustment of the screen mold 232 to different vertical positions. Mounted above the transfer or calender roll 235 are a pair of calender rolls 237 carried by shafts 238 journaled in bearings in the standards 234 and 234' for adjustment horizontally toward and from the mandrel adapted to be disposed therebetween upon the transfer roll 235 (Fig. 14c). The rolls 237 operate in a manner similar to the rolls 43, described above (Fig. 1), and apply moist layers of cementitious material to the initial layer on the mandrel applied by the molding screen or transferred thereto by the calender rolls 235.

The molding screen is driven by a gear 239 on the shaft 233, while the calender or transfer roll 235 is driven by a gear 240 on the shaft 236. The gears 239 and 240 are adapted to be connected with a suitable power drive for operation thereby in properly timed relation.

The rolls 237 are driven through a train of gears from a shaft 241, having a driving gear 242 thereon at one end, which may be driven from the same power drive that operates the gear 239 and 240. The opposite end of the shaft 241 carries a pinion 243 meshing with a gear 244, which gear in turn meshes with idler gears 245, which gears 244 and 245 are journaled on the pedestal 236. Gears 246 are fast on the shafts 238 of the rolls 237, and mesh with idler gears 245, being driven thereby. These gears are adjustable in their bearings as indicated by the arrows in Fig. 14b to maintain the driving connection to the rolls 237 even when said rolls are adjusted to accommodate pipes of different diameters or thickness.

In Figs. 17 to 25, inclusive, detail views of rollers, mandrels, screens, and tubes to be produced are shown.

The rollers 43 cooperate with the mandrel 36, which is shown as having series of perforations, and is closed at the ends by discs 121 and 122. Similarly, the cylindrical screen 32 is closed at the ends by discs 123 and 124.

When producing a tube with an integral bell collar, provision should be made for relative circumferential speed of the bell forming portions coacting with the mandrel, either of the calender roll, or the molding screen, as shown in Figs. 17a and 20a.

To accommodate for this, the roller 43a in Fig. 17a has a sleeve 43b journaled on the reduced end thereof to bear upon the enlarged portion of the mandrel. It is provided also with a collar 43c adjustable thereon to confine the material.

The molding screen 32a may be provided with a relatively movable section, designated 32b in Fig. 20a, for a like purpose, to provide uniform bearing engagement on the mandrel throughout its length, and to accommodate for differences in circumferential speeds due to the different diameters.

The tube T, as shown in Fig. 18, has a bell collar and is provided with a circumferential groove 125 on the outside near the end, and with an internal circumferential groove 126, in the collar, so that, upon interfitting of tubes, the grooves align to receive lead or composition, whereby the tubes are joined.

Instead of a collared tube, a straight tube T' may be produced by means of the cylindrical screen 127, the roller 128, and the mandrel 129.

If desired, the mandrel may be imperforate and provided with a fabric lining 130. In this case, the mandrel and tube, when placed on a vehicle, in view of the presence of the fabric, the mandrel may be removed by hand, as the fabric yields and the mandrel may be removed to insert a collapsible shell, which retains the shape of the tube.

In order to preclude the necessity of providing separate machines for various sizes of tubes, shells 131 may be provided to line the chambers of the compressing machine, so that one machine may be used for producing a number of tubes of various diameters, as will be readily understood.

Referring to Fig. 26, the process described is carried out there with a slight modification. The liquid mixture is stored in a vat 132, whence it flows onto a travelling screen or endless conveyor 133, which is in engagement with the lower end of the mandrel 36, to impart thereto the initial layer while again the rollers 43, receiving and moistening substantially dry mixture, compact additional layers onto the initial layer, as has been described in conjunction with the apparatus shown in Fig. 1. The main distinction is the fact that the rotary screen is replaced by the endless screen.

Provision may be made also in the apparatus shown in Fig. 6 for extracting the water from the tube by connecting a source of vacuum at one or both opposite ends of the cylinder 66. This connection may be made through the pipe 70 at one end and the pipe 69 at the opposite end, which will facilitate drying of the tube throughout its length, the water passing out of the tube through the perforations in the mandrel.

While the drawings show preferred embodiments of my improved apparatus, numerous changes and alterations may be made without departing from the spirit of the invention.

I, therefore, do not limit myself to the details of constructions and arrangement, as shown, but claim my invention as broadly as the state of the art permits.

I claim:

1. In a machine for forming pipes, the combination with a mandrel, of means for containing a liquid cementitious composition, means for transferring said liquid composition to the mandrel and forming an initial wet layer of cementitious material on the mandrel, rollers having bearing engagement with opposite sides of the mandrel, and means for forming a moistened layer of cementitious material on one of the rollers for transfer thereby onto the initial layer on the mandrel.

2. In a machine for forming pipes, the combination of a mandrel, means for containing a liquid cementitious composition, means for transferring said liquid composition to the mandrel and forming an initial wet layer of cementitious material on the mandrel, a roller having peripheral bearing engagement wtih the mandrel, means for pressing the roller against the mandrel, and means for forming a moistened layer of cementitious material on the roller for transfer thereby onto the initial layer on the mandrel.

3. In a machine for producing pipes, the combination with a mandrel, of means for containing a liquid cementitious composition, means for transferring said liquid composition to the mandrel and forming an initial wet layer of cementitious material on the mandrel, a roller having bearing engagement with the mandrel, resilient means pressing the roller against the mandrel, and means for forming a layer of cementitious material on the roller for transfer thereby to the mandrel.

4. In a machine for producing pipes, the combination with a mandrel, of means for forming an initial layer of cementitious material on the mandrel, a roller having peripheral bearing engagement with the mandrel, means for moistening the periphery of said roller, and means for applying cementitious material to the moistened surface of the roller to form a layer thereon for transfer onto the initial layer on the mandrel.

5. In a machine for producing pipes, the combination with a mandrel, of means for forming an initial layer of cementitious material on the mandrel, a roller having peripheral bearing engagement with the mandrel, resilient means pressing the roller against the mandrel, means for moistening the surface of the roller, and means for applying relatively dry cementitious material onto the moistened surface of the roller to form a layer thereon for transfer onto the initial layer on the mandrel.

6. In a machine for producing pipes, the combination with a mandrel, of a screen mold adapted to operate in a liquid suspension of cementitious material and in peripheral contact with the mandrel for forming an initial layer thereon, rollers having peripheral bearing engagement with opposite sides of the mandrel, resilient means acting on the rollers tending to press the same toward the mandrel, means for moistening the peripheral surface of each of the rollers, and means for applying relatively dry cementitious material to the moistened surface of each roller to form a layer thereon for transfer onto the initial layer on the mandrel.

7. In a machine for producing pipes, the combination with a mandrel having journal pins on opposite ends thereof, of a screen mold adapted to operate in a liquid suspension of cementitious material to apply an initial layer to the mandrel, and means forming vertical slots slidably receiving the journal pins therein and mounting the mandrel over the screen mold for pressing engagement against the periphery of the screen mold by gravity pressure, and calender rolls arranged on opposite sides of the mandrel in bearing pressure relation.

8. In a machine for producing pipes, the combination with a mandrel having journal pins on opposite ends thereof, of a vat adapted to contain a liquid suspension of cementitious material, a screen mold operatively mounted in the vat for transferring a layer of cementitious material to the mandrel, and means forming vertical slots slidably receiving the journal pins therein and for guiding the mandrel for vertical sliding movement over the screen mold and for bearing pressure engagement with the screen mold by gravity, and calender rolls arranged on opposite sides of the mandrel in bearing pressure relation.

9. In a machine for producing pipes, the combination with a mandrel having portions of different diameters for forming pipes with bell collars, of a screen mold for applying the initial layer of cementitious material onto the mandrel, said screen mold having different sections thereof of different diameters complementary with the sections of the mandrel, and means mounting the sections of the screen mold for relative rotation.

10. In apparatus for producing pipes, the combination of a rotary screen mold adapted to supply cementitious material to a mandrel having portions of different diameters for forming pipes with bell collars, said screen mold having longitudinally arranged screen sections thereof of different diameters constructed for relative movement in cooperation with the mandrel.

11. In apparatus for producing pipes, the combination with a mandrel having portions thereof of different diameters for forming a pipe thereon with a bell collar, of a screen mold constructed to operate in a liquid suspension of cementitious material and to apply a layer thereof onto the mandrel, said screen mold having different longitudinal screen sections thereof constructed of different diameters corresponding with the sections of the mandrel and arranged for relative rotation to each thereof.

12. In apparatus for producing pipes, the combination with a mandrel having portions thereof of different diameters for forming a pipe thereon with a bell collar, of a screen mold constructed to operate in a liquid suspension of cementitious material and to apply a layer thereof onto the mandrel, said screen mold having different longitudinal screen sections thereof constructed of different diameters corresponding with the sections of the mandrel and arranged for relative rotation to each other, and calender rolls on opposite sides of the mandrel in peripheral bearing relation therewith, each of said calender rolls being constructed with longitudinal sections thereof of different diameters complementary to the sections of the mandrel.

13. In apparatus for producing pipes, the combination with a mandrel, of a screen mold adapted to operate in a liquid suspension of cementitious material and to apply the same to the mandrel, means mounting said mandrel over the screen mold with the axis of said mandrel arranged substantially in vertical alignment with the axis of the screen mold, calender rolls arranged on opposite sides of the mandrel and mounted for relative movement toward each other, and means for pressing the calender rolls inwardly in bearing relation against opposite sides of the mandrel.

14. In apparatus for producing pipes, the combination of a rotary drum member arranged substantially in horizontal relation and adapted to receive a mandrel thereover above the axis of the rotary member, calender roll members arranged in spaced relation on opposite sides of the axis of the rotary member and spaced thereabove in position to receive the mandrel therebetween and to bear against opposite sides thereof, means mounting said calender roll members for relative movement toward and from each other, pressure means for pressing the calender roll members substantially in opposed directions to apply pressure against opposite sides of the mandrel, and means for supplying cementitious material to one of said members for transfer to the mandrel and to form a layer on the mandrel.

15. Apparatus for molding tubes having a bell end from a cementitious composition material, including a vat containing the material in suspension, a rotary screen in said vat filtering out the liquid from said material, a mandrel above said screen and substantially in vertical registry with the screen and arranged in position for transfer of the wet layer adhering to said screen to said mandrel, and means for superposing on the wet layer adhering to said mandrel a layer of moist material under pressure and before the next succeeding layer is applied to said mandrel.

16. Apparatus for molding tubes from a fibrous cementitious composition material, including a vat containing the material in suspension, a rotary screen with a bell end in said vat filtering out the liquid from said material, a mandrel above said screen and substantially in vertical registry with the screen and arranged in position for transfer of the wet layer adhering to said screen to said mandrel, and means for directly superposing on the wet layer adhering to said mandrel a layer of moist material under pressure before the next succeeding layer is applied to said mandrel.

17. Apparatus for molding tubes having a bell end from a fibrous cementitious composition material, including a vat containing the material in suspension, a rotary screen with a bell-forming end in said vat filtering out the liquid from said material, a mandrel in position for transfer of the wet layer adhering to said screen onto said mandrel, means for superposing on the wet layer adhering to said mandrel a layer of fibrous cementitious material, and means for compacting the layers on said mandrel before the next succeeding layer is applied from the screen.

18. Apparatus for molding tubes having a bell end from a fibrous cementitious composition material, including a vat containing the material in suspension, a rotary screen with a bell end in said vat filtering out the liquid from said material, a mandrel in position for transfer of the wet layer adhering to said screen to said mandrel, means for superposing on the wet layer adhering to said mandrel a layer of moist material, and means for compacting the layers on said mandrel before the next succeeding layer is applied to the mandrel.

19. Apparatus for molding tubes from a cementitious compositon material, including a vat containing the material in liquid suspension, a rotary screen in said vat filtering out the liquid from said material, a mandrel above said screen in position for transfer of the wet layer adhering to said screen to said mandrel, and means for superposing on the wet layer adhering to said mandrel a layer of moist material and including calender rollers cooperating with said mandrel for compacting the layers thereon before the next succeeding layer is applied to the mandrel.

20. In an apparatus for producing pipes having a bell end from a fibrous cementitious material, a vat containing said fibrous cementitious material in suspension, a mold screen having a bell-forming end portion and suspended in the vat in position for transferring a layer of said material from the vat to a mandrel, said mandrel being adapted to form a pipe thereon with a bell collar, and means for compacting the layer on the mandrel and constructed with longitudinally spaced portions thereof of different diameters coacting with the different portions of the mandrel.

21. In apparatus for forming pipes on a mandrel, a roller adapted to bear against the periphery of the mandrel, means mounting said roller for turning movement, a liquid spray arranged for directing liquid onto the peripheral surface of the roller during rotation thereof, and means for applying substantially dry cementitious material to the wet surface of the roller at a point in the turning movement thereof intermediate the point of application of liquid and the point of contact with the mandrel.

22. In apparatus for forming pipes, the combination with a mandrel, of means for containing a liquid suspension of cementitious composition, means for forming a wet layer from said material and for transferring said layer to the mandrel, means forming a moistened surface mounted in moving pressure relation against a side of the mandrel, means for applying substantially dry cementitious composition material to said moistened surface for transfer thereby onto the mandrel in superposed relation with the wet layer thereon, and means for pressing the moving surface against the mandrel.

23. In pipe forming apparatus for producing pipes, a roller member, means journaling said roller member for turning movement adapted to receive a coated mandrel thereover, a plurality of horizontally spaced rolls above said first-mentioned roller member and arranged to be disposed on opposite sides of the mandrel and to be moved in opposed directions toward each other, and means for applying pressure to said rolls in opposed directions toward the opposite sides of the mandrel.

24. In a machine for producing pipes, the combination with a mandrel having journal pins on opposite ends thereof, of a roller member beneath the mandrel in position for bearing relation of the mandrel on the upper side of the roller member, relatively movable calender rolls arranged on opposite sides of the mandrel, pressure means acting to move the calender rolls substantially in opposed directions in pressure bearing relation with opposite sides of the mandrel, means for supplying cementitious material to the mandrel to build up layers thereon under the pressure of the calender rolls, and means holding the mandrel over the roller member for turning movement and for bodily raising movement relative thereto between the calendar rolls during the building up of layers on the mandrel.

25. In apparatus for producing pipes, the combination of a mandrel, a rotary screen mold arranged substantially in horizontal relation beneath the mandrel and having the axis thereof approximately parallel with the axis of the mandrel, relatively movable calender rolls arranged in spaced relation on opposite sides of the axis of the mandrel, pressure means acting to move the calender rolls substantially in opposed directions against opposite sides of said mandrel, and means for supplying cementitious material to the screen mold for transfer therefrom to form a layer on the mandrel.

26. In a machine for producing pipes, the combination of frame structures spaced apart, a mold screen journaled in the frame structures at opposite ends thereof, a set of calender rolls spaced apart and disposed above the mold screen in position to receive a mandrel therebetween, a transfer roll superposed on the mold screen in position for transfer of material from the mold screen onto the mandrel between the calender rolls, means mounting the calender rolls in the frame structures for turning movement and also for relative bodily movement toward and from each other, means for driving the mold screen and transfer roll at one end thereof, and means for driving the calender rolls including a train of gears at the opposite end thereof from the first-mentioned driving means and adapted for operative connection with the first-mentioned driving means.

27. In apparatus for producing pipes, the combination of a set of calender rolls spaced apart and adapted to receive a mandrel therebetween, a mold screen adapted to form a layer of cementitious material, a transfer roll superposed on the mold screen and arranged beneath the calender rolls for transferring the layer from the mold screen onto the mandrel, driving means connected with the mold screen at one end thereof for operating said screen, and separate driving means at the opposite end of the calender rolls for driving said calender rolls.

28. In a machine for producing pipes, the combination with a mandrel, of means for containing a liquid cementitious composition, a mold screen operatively mounted to form a layer thereon of the composition, a roll having peripheral bearing engagement with the mandrel, means for pressing the roll against the mandrel, means for forming a moistened layer of cementitious material on said roll for transfer thereby onto the mandrel, and a transfer roller interposed between the mold screen and the mandrel for transferring the layer from the mold screen onto the mandrel.

29. In a machine for producing pipes, the combination with a mandrel, of means for containing a liquid cementitious composition, a mold screen operatively mounted to form a layer thereon of the composition, a roll having peripheral bearing engagement with the mandrel, means for pressing the roll against the mandrel, means for forming a moistened layer of cementitious material on said roll for transfer thereby onto the mandrel, a transfer roller interposed between the mold screen and the mandrel for transferring the layer from the mold screen onto the mandrel, and means at respectively opposite ends for driving the pressure roll and the mold screen.

JOHN FERLA.